US008763622B2

(12) United States Patent
Trottier

(10) Patent No.: US 8,763,622 B2
(45) Date of Patent: Jul. 1, 2014

(54) DYNAMIC SELF-CHECKING INTERLOCK MONITORING SYSTEM

(75) Inventor: Robert R. Trottier, Andover, MA (US)

(73) Assignee: Scully Signal Company, Wilmington, MA (US)

( * ) Notice: Subject to any disclaimer, the term of this patent is extended or adjusted under 35 U.S.C. 154(b) by 632 days.

(21) Appl. No.: 13/075,852

(22) Filed: Mar. 30, 2011

(65) Prior Publication Data

US 2011/0240136 A1 Oct. 6, 2011

Related U.S. Application Data

(60) Provisional application No. 61/319,120, filed on Mar. 30, 2010.

(51) Int. Cl.
*F16K 37/00* (2006.01)

(52) U.S. Cl.
USPC ............ 137/1; 137/552; 137/554; 251/149.6; 285/93

(58) Field of Classification Search
USPC ............... 137/552, 554, 614, 614.02, 614.03, 137/614.04, 1; 251/149.1, 149.6; 285/93
See application file for complete search history.

(56) References Cited

U.S. PATENT DOCUMENTS 3,074,670 A * 1/1963 Breuning ........................ 285/93
3,098,500 A * 7/1963 Gruber .......................... 137/554
3,522,596 A * 8/1970 Fowler et al. ................. 137/554
3,846,774 A * 11/1974 Thorbard et al. ............. 137/554
3,859,619 A 1/1975 Ishihara et al.
3,896,280 A 7/1975 Blake
4,874,015 A * 10/1989 Schirmacher ................. 137/554
5,040,827 A * 8/1991 DeLange ........................ 285/93
5,151,840 A * 9/1992 Siefken ........................... 361/13
5,249,612 A 10/1993 Parks et al.
5,273,087 A 12/1993 Koch et al.
6,006,784 A * 12/1999 Tsutsui et al. ............. 251/149.1
6,143,996 A * 11/2000 Skanda ........................ 200/61.6
6,170,539 B1 1/2001 Pope et al.
6,246,331 B1 * 6/2001 McHugh et al. .............. 137/554
6,499,719 B1 * 12/2002 Clancy et al. .............. 251/149.6
6,679,291 B1 * 1/2004 Fahl et al. ................ 137/614.06
2001/0004909 A1 6/2001 Pope et al.
2002/0007854 A1 * 1/2002 Dilger et al. .................. 137/554
2003/0033868 A1 2/2003 Posey et al.
2006/0207345 A1 * 9/2006 Rankin ...................... 73/861.93
2007/0209716 A1 9/2007 Rankin
2009/0107580 A1 4/2009 Enge et al.
2010/0023170 A1 1/2010 Sherwood
2010/0181244 A1 * 7/2010 Stimpson ...................... 210/232

* cited by examiner

*Primary Examiner* — John Rivell
(74) *Attorney, Agent, or Firm* — Preti Flaherty Beliveau & Pachios LLP; Paul D. Sorkin

(57) ABSTRACT

An interlock monitoring system includes a magnetic proximity sensor within a poppet valve type coupler to detect whether the poppet valve is opened or closed. An open poppet valve indicates a proper connection. The sensor consists of dedicated electronics that prevent cheating, or bypassing, by either shorting out or opening the contacts to the sensor. In addition, a ferrous metal proximity switch is used to provide a redundant confirmation of proper connection of the coupler. The ferrous magnetic proximity switch will indicate whether or not the coupler is actually in contact with an appropriate connection. Each of the magnetic proximity sensor and the ferrous magnetic proximity switch must indicate a respective proper condition in order to determine a valid interlock condition.

56 Claims, 10 Drawing Sheets

DYNAMIC SELF-CHECKING INTERLOCK MONITORING SYSTEM

CROSS REFERENCE TO RELATED APPLICATIONS

This application is a non-provisional application claiming priority from U.S. Provisional Patent Application No. 61/319,120 filed Mar. 30, 2010 entitled "Dynamic Self-Checking Interlock Monitoring System."

BACKGROUND OF THE INVENTION

In the fuel loading industry where a fuel truck is being loaded with a liquid or fuel that is often flammable, in order to meet mandated safety requirements, several parameters of the fuel transfer process are routinely monitored for compliance with loading operations standards. These parameters include, commonly, assuring that a static ground is present in order to prevent sparking and monitoring tank capacity in order to avoid an overfill condition and possible fuel spill.

In addition, vapor recovery during the filling process, in order to meet environmental and safety guidelines, is becoming increasingly important. Many of the current fuel loading monitoring systems are inadequately equipped for detecting that vapor recovery is being properly implemented.

In order to minimize the release of vapor into the atmosphere, as fuel is loaded into a modern tanker, the vapor in the vehicle is exhausted through a pressure valve at the top of the tank and run through piping that terminates in a coupling typically mounted on the rear of the vehicle. Many loading racks have a vapor recovery system to capture these vapors and either burn them off or otherwise process them.

Operators of fuel loading stations need to make sure that the vapor hose is connected to prevent vapor being exhausted into the atmosphere. Thus, these operators need an automatic system to prevent the loading operation from commencing without the vapor capture and monitoring systems being in place.

Currently, there are two approaches: 1) vapor monitoring in which a thermistor sensor is inserted into a vapor recovery hose. The thermistor sensor consists of two thermistors with one thermistor being a reference and isolated from the vapor flow and a second sensing thermistor positioned in the vapor flow. In operation, when the vapor is flowing, the thermistor in the flow is cooled by the vapor and the control electronics senses a difference in the respective thermistor resistances and indicates a vapor flow is established. This method is effective, however, it is known to take a not insignificant amount of time after the product or liquid is loaded before vapor starts to flow in order to make a reading. To deal with this delay, the operator must set a grace period (usually 1 to 5 minutes) before which the vapor monitoring system cannot be relied on to have sensed a vapor flow. If no vapor flow is detected after the grace period the controller stops the loading of fuel. The issue is that significant vapor can be sent into the atmosphere if the hose is not connected during this grace period while fuel is being added.

A second method of vapor recovery uses a switch mounted on the vehicle that is activated by the coupling of the vapor recovery hose. This switch is connected in such a way that it enables on-board vehicle electronics (if so equipped) to prevent fuel loading without an indication that the vapor hose is connected. There are several weaknesses to this method including: 1) the switch is external to the truck and easily bypassed with locking pliers and the like; 2) not all vehicles have on-board electronics that would be compatible with the switch; and 3) the load rack operator is ultimately responsible for making sure the vapor recovery takes place. The loading rack operator, therefore, needs to confirm for themselves to prove to the appropriate regulatory authorities that they, and not the fuel truck drivers (many of whom are known to bypass the system in order to load up faster), are assuring that the vapor hose is connected.

Traditionally, known vapor recovery systems use only the pressure from the tank to exhaust the vapor from the tank with a poppet valve located on the truck outlet to prevent vapors from leaking unless a vapor hose is connected. The rack side hose generally only has a pin that opens the poppet valve on the tanker connection. Recently, however, many rack operators have started using vacuum assist vapor recovery systems that contain a vacuum to draw residual vapor from the hose after the tanker has disconnected.

In addition to the vacuum assist couplings on the rack side of the hose there are now hoses with integral poppet valves to further reduce vapor from escaping during fuel transfer.

What is needed, however, is a system for automatically disabling fuel transfer if it is determined that the vapor recovery system is not properly connected. Such a system must be one that can be retrofitted onto existing trucks and racks and one that cannot be easily bypassed.

BRIEF SUMMARY OF THE INVENTION

Generally, an interlock monitoring system in accordance with an embodiment of the present invention includes a proximity sensor within a poppet valve hose type coupler to detect whether the poppet valve is opened or closed. The sensor consists of a proximity switch with dedicated electronics that prevents cheating by either shorting out or opening the contacts to the sensor. An insulated wire, for example Teflon®, travels through the vapor hose and out an exit port to allow the insulated wire to exit the vapor system without creating leaks. A dedicated controller provides intrinsically safe wiring to the sensor assembly and continuously monitors the connections as well as the sensor. Should either the sensor or any of its associated wiring not respond to a self-checking signal within an appropriate time, the controller considers that a fault condition and opens the control contacts stopping product flow until the fault condition is cleared.

BRIEF DESCRIPTION OF THE SEVERAL VIEWS OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION OF THE INVENTION

This application claims priority to U.S. Provisional Application Ser. No. 61/319,120, filed on Mar. 30, 2010, titled "Dynamic Self-Checking Vapor Interlock Monitoring System" the entire contents of which is hereby incorporated by reference for all purposes.

Figure 1A:
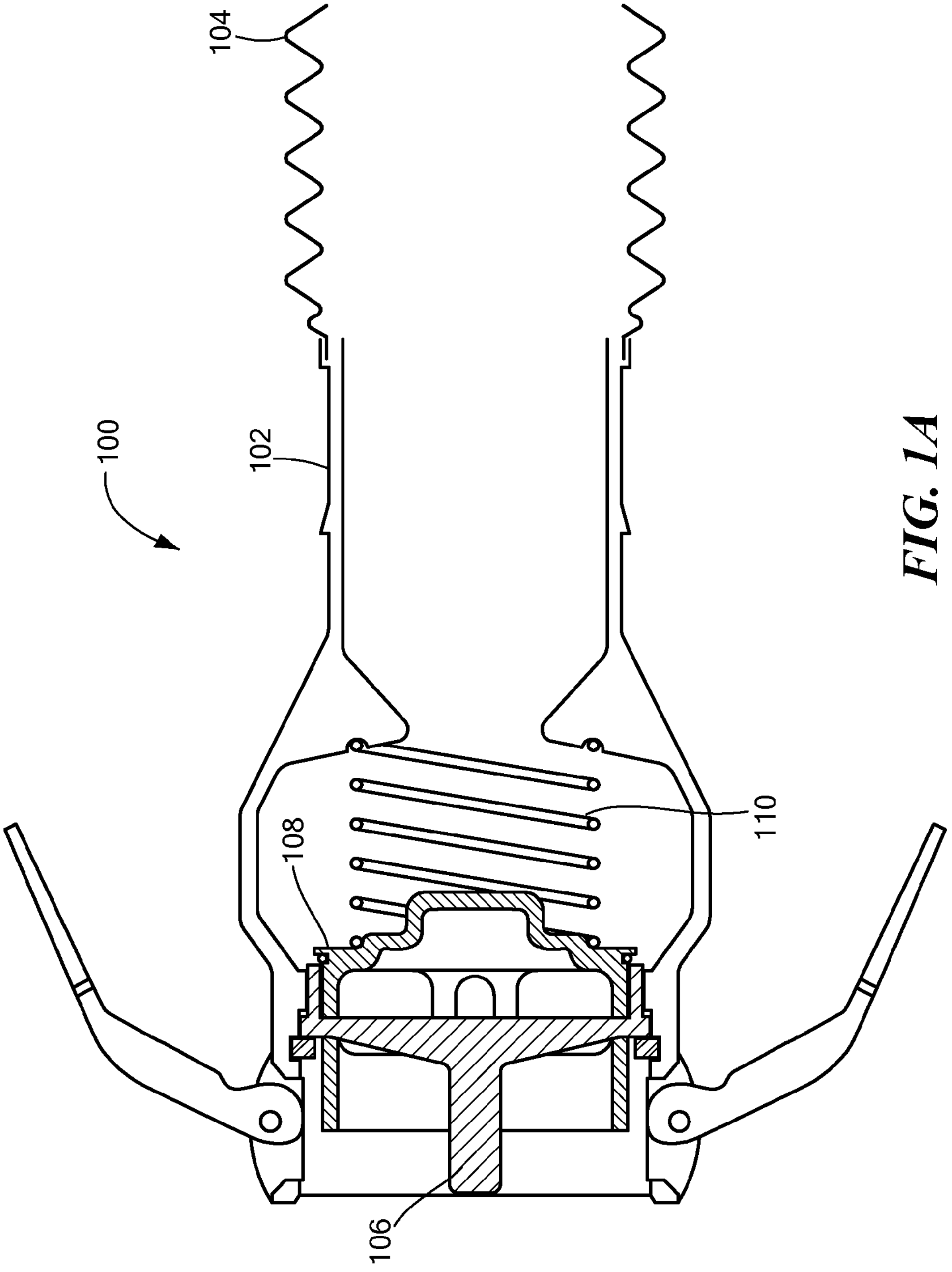
FIGS. 1A and 1B are cross-sectional drawings of a known vapor coupling poppet valve assembly.

Referring now to FIG. 1A, a known vapor coupler 100 usually provided as part of a filling rack includes a machined body 102 coupled to a flexible hose 104. A pin assembly 106 is provided to open a poppet valve on a fuel truck. A poppet 108 is normally biased closed, as shown in FIG. 1A, by a biasing spring 110.

Figure 1B:
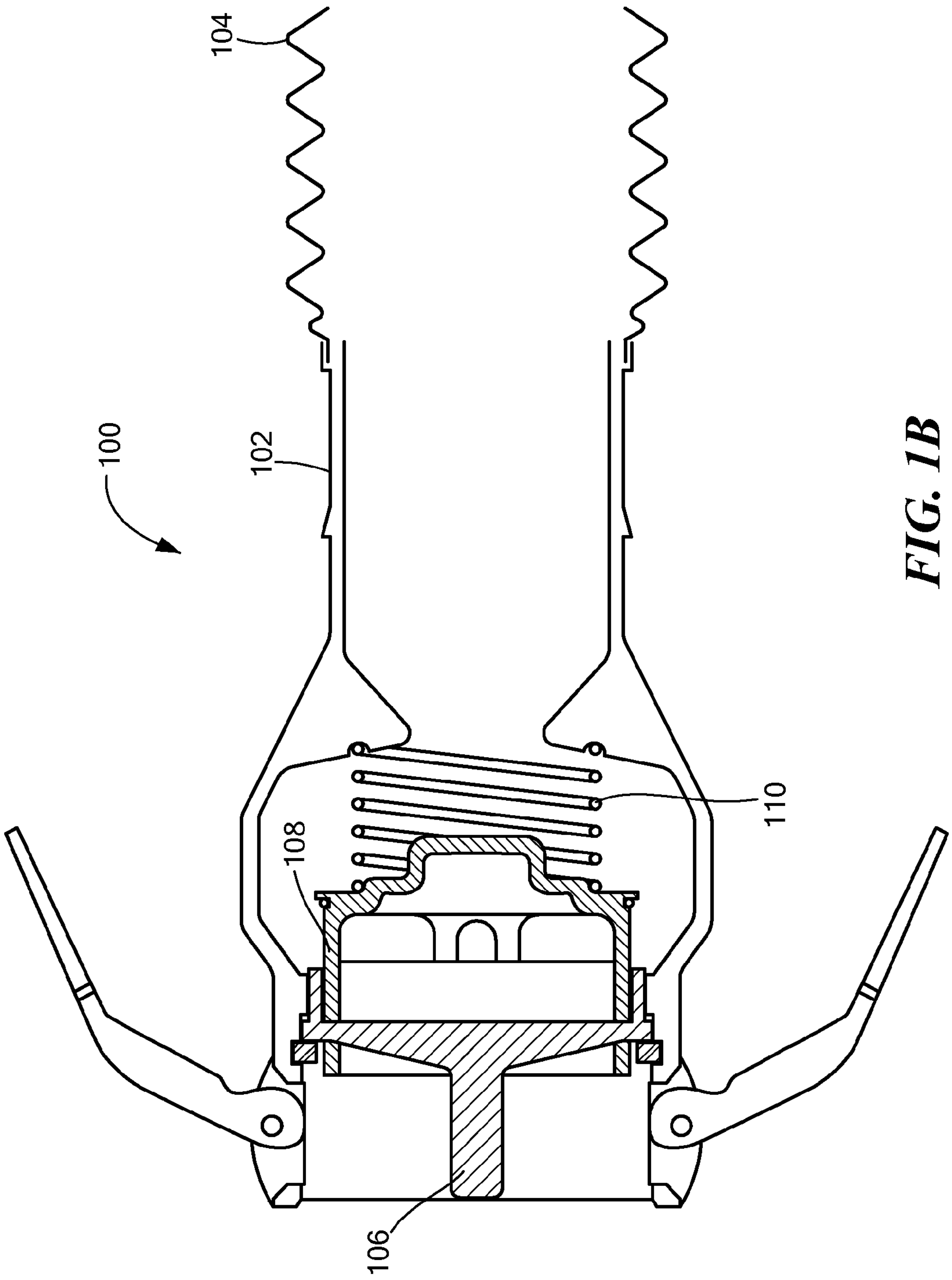

In operation, when the fuel truck couples to the vapor coupler 100, the poppet 108 is urged against the force of the biasing spring 110 by the coupling assembly of the truck as shown in FIG. 1B. The force of the coupling compresses the spring 110 and allows the poppet 108 to open and vapor to flow.

Figure 2A:
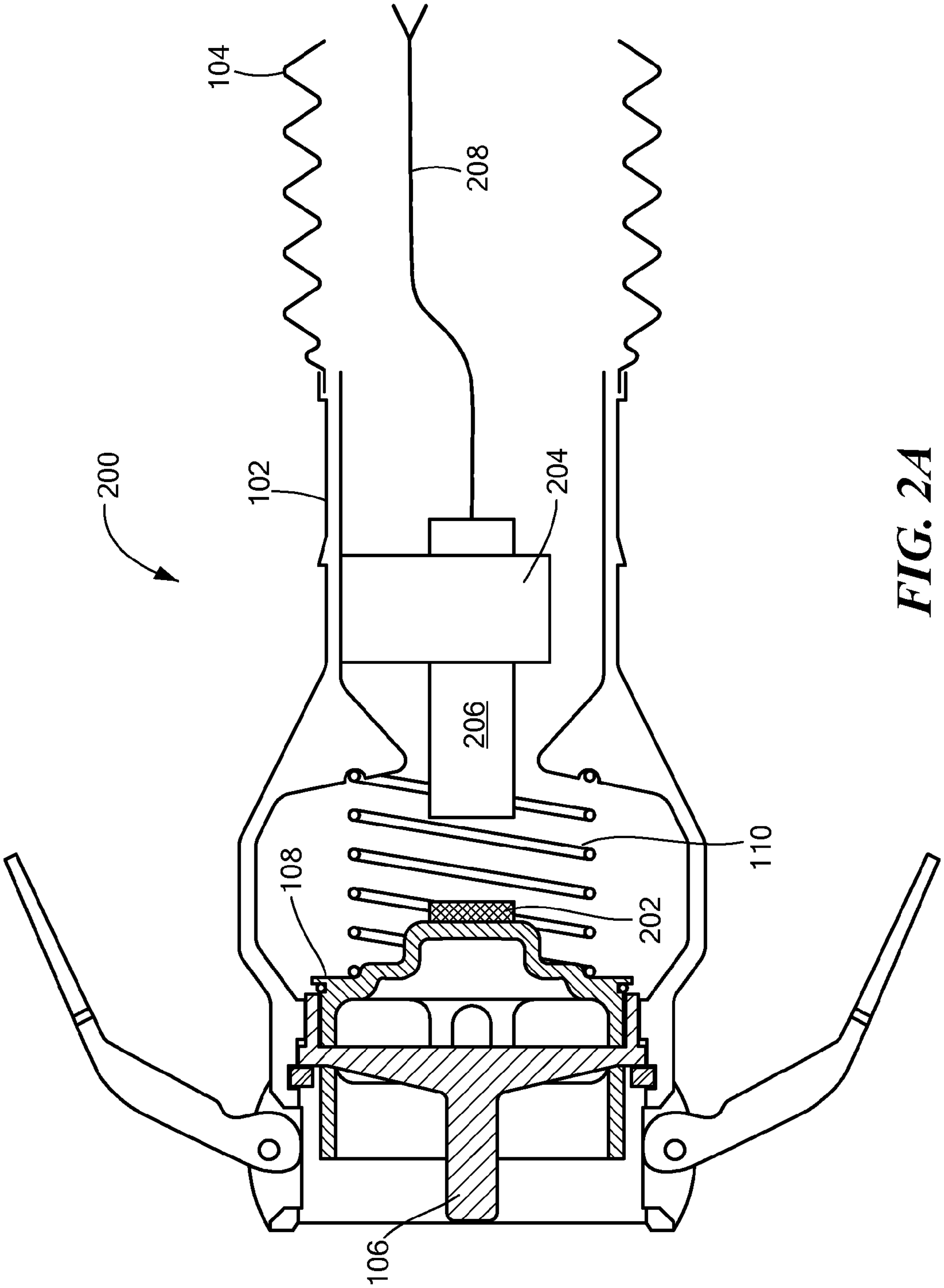
FIGS. 2A and 2B are cross-sectional drawings of a vapor coupling poppet valve interlock assembly in accordance with a first embodiment of the present invention.
Figure 2B:
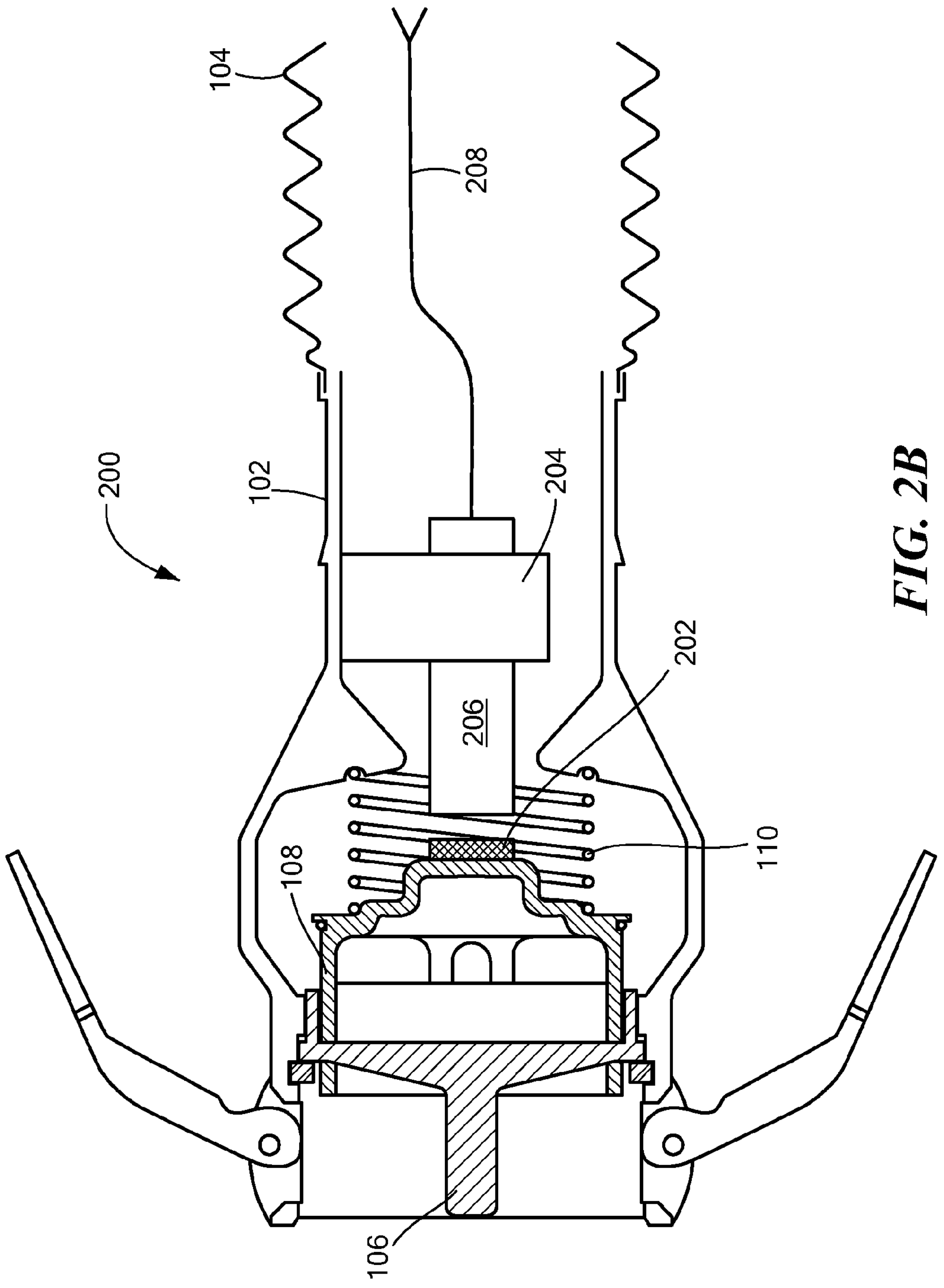

A vapor coupling poppet valve interlock 200 in accordance with a first embodiment of the present invention is presented in FIGS. 2A and 2B. A magnet 202 is provided on the poppet 108 and its function will be described below. A mounting block 204 is provided inside the machined body 102 to hold a sensor 206 near the poppet 108. The sensor 206 is positioned to detect the magnet 202 when the poppet 108 is opened by operation of a fuel truck connecting to a fueling rack. An output of the sensor 206 is provided by an output wire 208, here shown with two conductors, running through the flexible hose and out through a vapor-tight exit port or gland, not shown. The wire 208 may be made from Teflon® or similar material so as to not be affected by the vapor and/or not cause a spark or otherwise create a possibly dangerous condition.

Alternatively, the sensor 206 may be provided with wireless capabilities in order to communicate with the controller. Of course, the signal strength and characteristics would need to comply with any safety standards or regulations. Advantageously, a vapor coupler 100 with a wireless sensor would facilitate retrofitting of a system as only the coupling need be replaced and a wire would not need to be inserted through the hose. Further, a wireless system would not have a wire that might be susceptible to breakage due to it coiling or uncoiling as the hose is moved.

Thus, as shown in FIG. 2A when the poppet 108 is in its "rest" position, the magnet 202 is far enough away from the sensor 206 that the system will indicate that the vapor recovery hose is not connected. As shown, in FIG. 2B, however, when the poppet 108 is urged against the spring 110, the sensor 206 will detect the magnet 202 and indicate that the vapor hose has been connected.

The mounting block 204 and the sensor 206 are configured and placed to repeatably, and accurately, indicate whether the vapor recovery hose is connected. A monitoring system, not shown, will receive the output from the sensor 206, along the wire 208, and only allow the flow of fuel if the sensor indicates that the vapor recovery hose is properly connected.

Figure 3A:
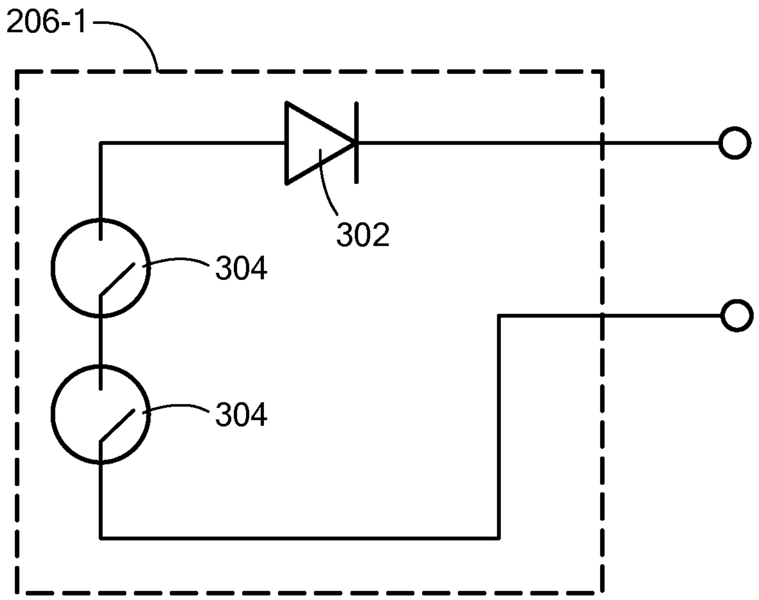
FIGS. 3A and 3B are schematics of alternate sensing circuits in accordance with multiple variations of the first embodiment of the present invention.

Referring now to FIG. 3A, in one embodiment of the sensor circuit 206-1, two normally-open magnetic reed switches 304 are provided in series with a diode 304. A monitoring system, which will be generally described below, will detect the output of the sensor circuit 206-1 to determine the status of the vapor coupling. Thus, when not connected, the switches 304 will remain open. When, however, the poppet 108 is urged against the spring 110, the magnet 202 will be closer to the switches 304 and they will close. Thus, when closed, the diode 302 will appear to the monitoring system and be detected as below.

It should be noted that two switches 304 are placed in series with one another to provide a level of redundancy. One of ordinary skill in the art will understand that only one switch need be provided or more than two switches could be used. Similarly, multiple diodes could be provided for redundancy.

Figure 3B:
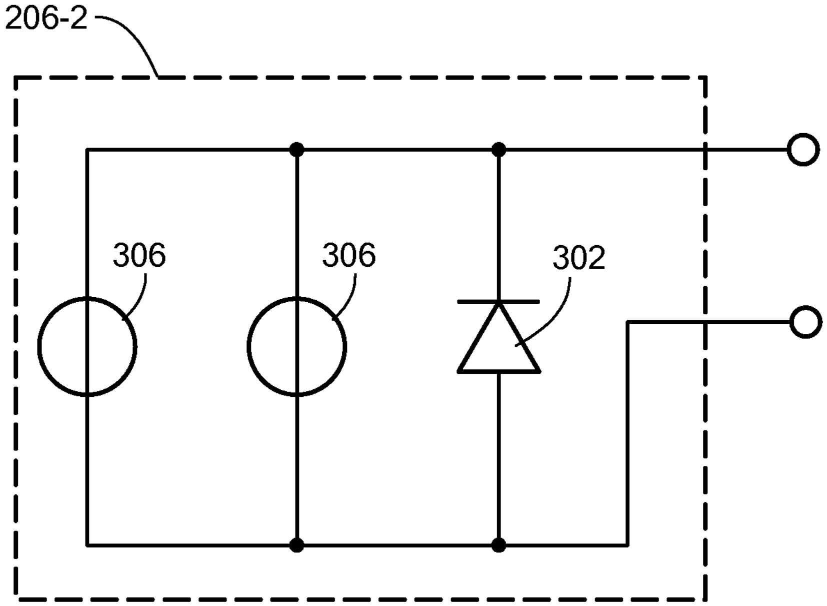

An alternate embodiment sensor 206-2, as shown in FIG. 3B, incorporates two normally closed magnetic reed switches 306 in parallel with a diode 302. When the poppet 108 is urged inward, the magnet 202 will cause the switches 306 to open thus placing the diode 302 across the output wires 208 for detection by the monitoring system.

The foregoing embodiment of the present invention is an improvement over known systems as it is not at all visible to the user because all components are hidden from view, i.e., from the nozzle end of the hose. A user might be able to figure out that if you jammed the poppet valve in you might fool it so a second interlock is available to further frustrate cheats as will be described below.

Figure 4A:
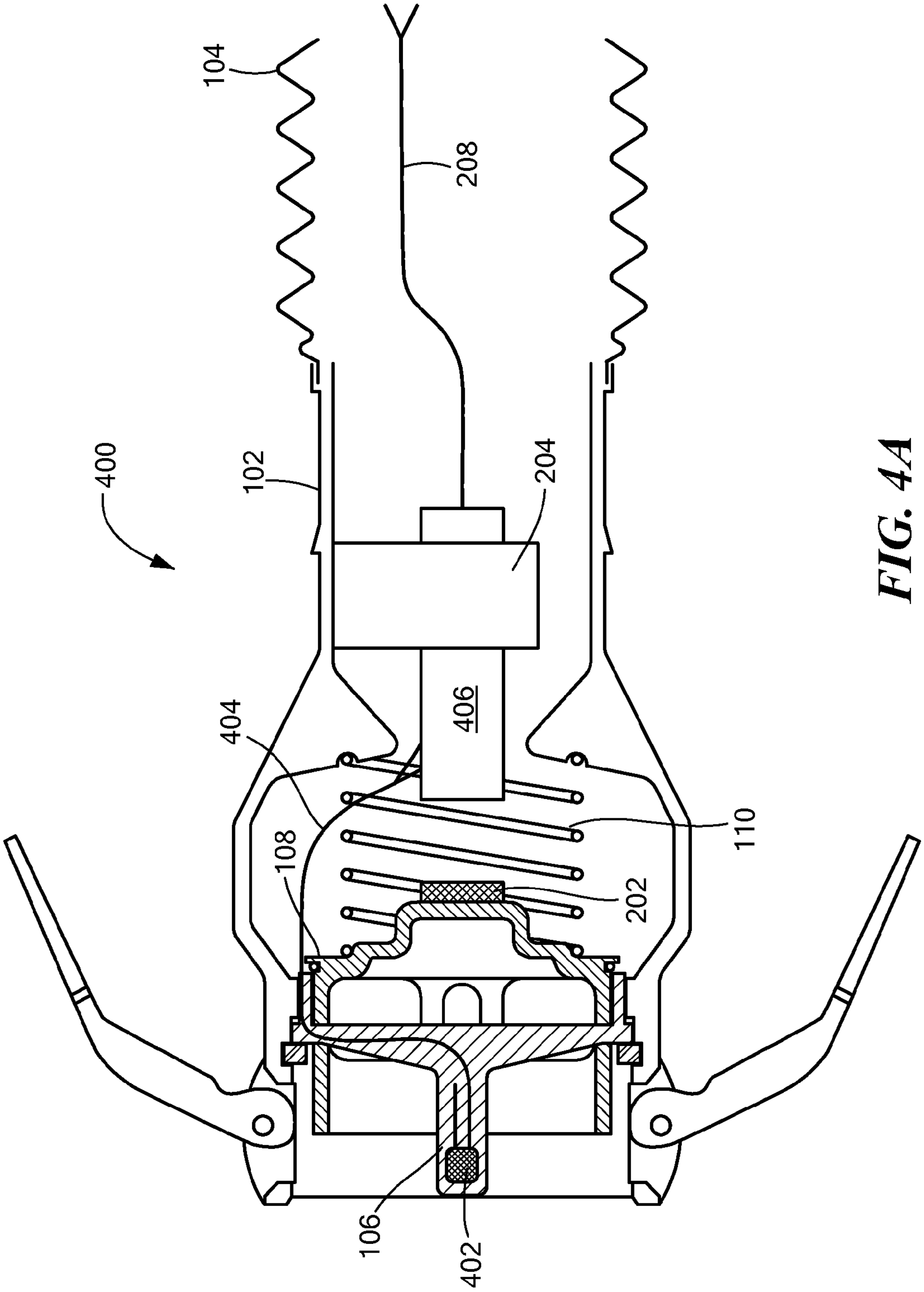
FIGS. 4A and 4B are cross-sectional drawings of a vapor coupling poppet valve interlock assembly in accordance with a second embodiment of the present invention.
Figure 4B:
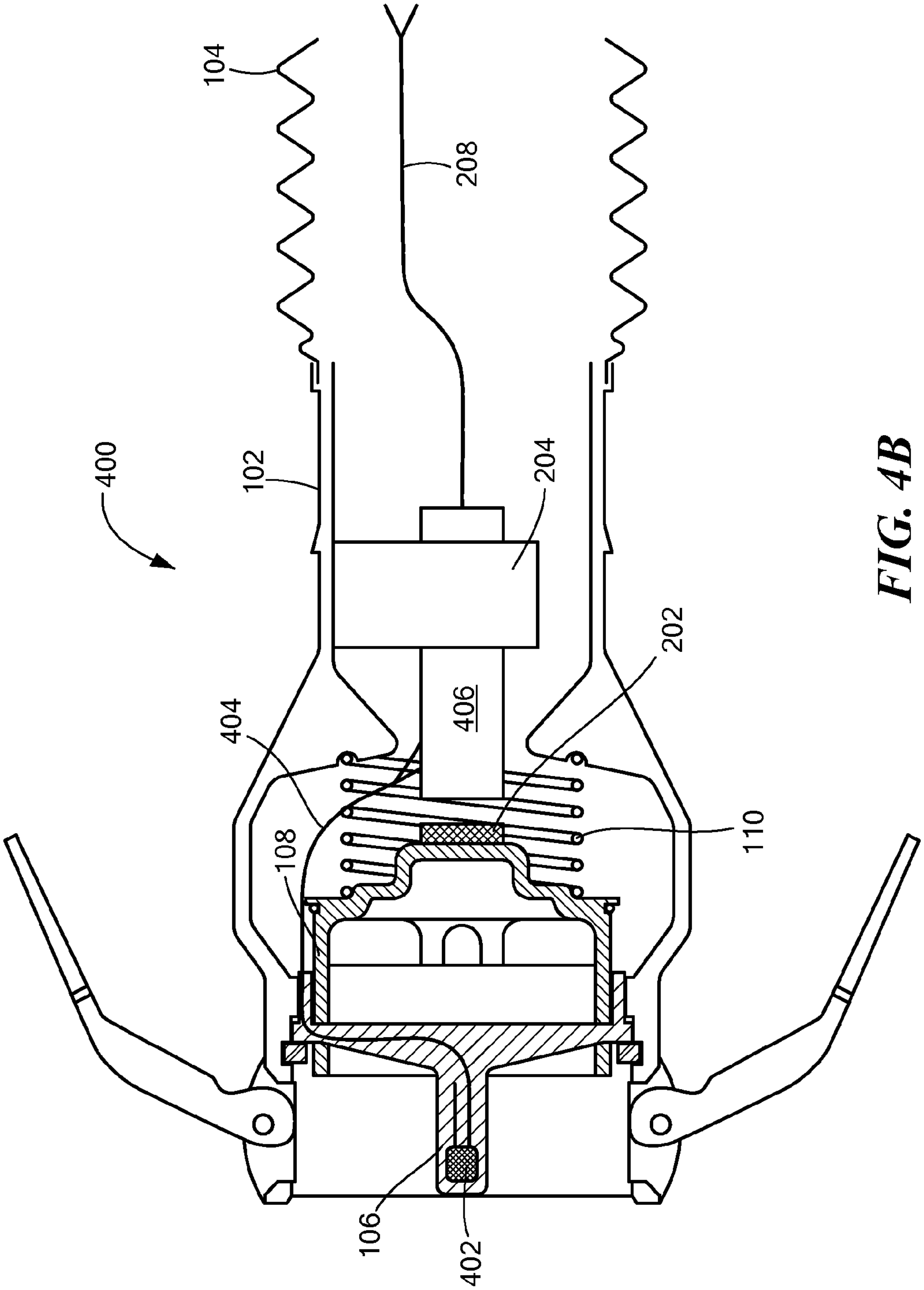

A vapor coupling poppet valve interlock assembly 400 in accordance with a second embodiment of the present invention is presented in FIGS. 4A and 4B. Many components of this assembly 400 are the same as that shown in the embodiment presented in FIGS. 2A and 2B. A ferrous metal proximity sensor 402, such as the N-Series switch from Magnasphere Corp. of Waukesha, Wisc., is provided in the pin 106. The ferrous sensor 402 comes in either a normally-open or normally-closed configuration and will switch states when in proximity with a ferrous metal such as the pin on the coupling mechanism of the truck. The sensor 402 is coupled, via a wire 404, to a sensor 406 that will be described in more detail below.

In operation, similar to the embodiment described above, when the vapor coupling assembly 400 is attached to the truck's connector, the poppet 108 and magnet 202 will be urged toward the sensor 406. The ferrous metal proximity sensor 402 will change state and that change in state is coupled to the sensor 406.

Figure 5A:
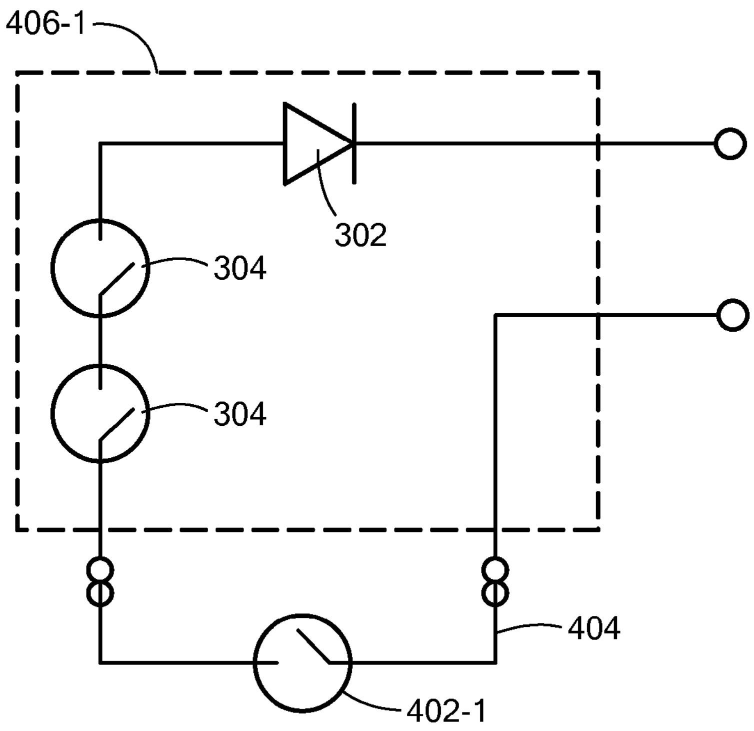
FIGS. 5A and 5B are schematics of alternate sensing circuits in accordance with multiple variations of the second embodiment of the present invention.

One embodiment of the sensor 406 combined with the ferrous sensor 402 is shown in FIG. 5A. As shown, a ferrous proximity sensor 402-1 is normally open and is provided in series with two normally open switches 304 and a diode 302. In operation, when the vapor coupling is attached, these switches will all close and the diode 302 will be presented across the output wire 208.

Figure 5B:
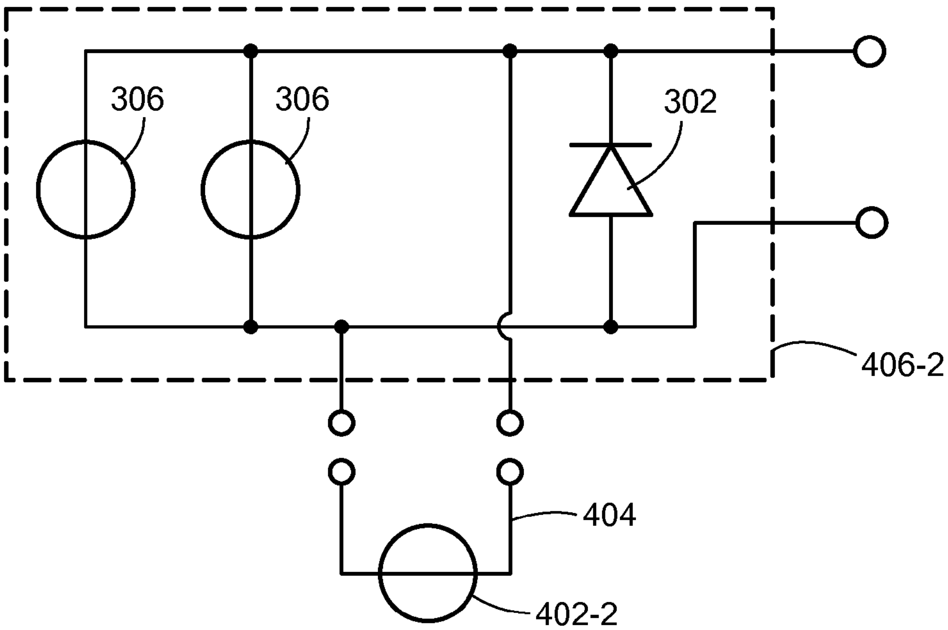

Alternately, as shown in FIG. 5B, normally closed switches 306 and a normally closed ferrous proximity sensor 402-2 are provided in parallel with a diode 302. When the poppet 108 is urged open, the diode is presented across the output wire 208.

Advantageously, by inserting the ferrous sensor 402 into the pin 106 of the coupling, fuel operation requires both the poppet valve to be opened and a piece of metal to be in contact with the pin 106. This additional sensor provides another level of confirmation of proper configuration prior to fueling.

An existing controller such as is available from Scully Signal Company, Wilmington, Mass. may be coupled to the output of the sensor to determine proper vapor capture. The controller may consist of a power supply, intrinsically safe outputs to the sensor assembly and control relays. The controller has a comparator that compares a reference voltage to a preset voltage and when the preset voltage is less than the reference voltage a fueling relay remains open and no fuel flows.

In operation, one wire of the output wire 208 is tied to ground and a small AC voltage or signal is applied to the other wire. The controller has within it a pair of capacitors and a pair of associated diodes that are connected to this AC signal. The circuit is designed as a pair of symmetrical charge pumps with respective voltages that are summed and added to the preset voltage.

In the case of normally closed proximity and reed switches, both the positive and negative portions of the sine wave, i.e., the AC signal, charge their associated capacitors and the net voltage change is zero and no fuel flows. Conversely, when the wires are open, in the case of normally open switches, no current flows leaving both capacitors discharged and again resulting in a net voltage of zero that prevents the flow of fuel.

When the poppet valve opens, in the case of normally closed parallel connected switches, the diode will allow only the negative portion of the sine wave to pass and as a result one capacitor will charge and the other will not. This will result in a net increase in the voltage across the capacitors and when added to the preset voltage will exceed the reference voltage. The comparator detecting this difference will close a relay indicating a valid vapor connection and fuel will flow. Similarly, when the series connected switches move into the closed position from their normally open position, the diode will be presented and operation will occur as described in the foregoing.

The capacitors are chosen to have small discharge times and any interruption in the signal through the diode will allow the capacitors to discharge thus lowering the net voltage that will be detected by the comparator which will open the relay contacts and prevent fueling.

In one embodiment, the sensors 206, 406 are housed in a threaded aluminum shaft to maintain their relative positioning and then potted to resist the vapor and to provide an intrinsically safe device in the explosive vapor. Of course other materials may be chosen.

The sensor may be mounted into the mounting block 204 by operation of a threaded portion that allows the sensor to be adjusted relative to the back of the poppet and the magnet.

Advantageously, the magnet 202 is mounted on the back of the poppet 108 which conceals it from view from the front of the coupling. This lowers the chances of tampering.

In operation, the sensor 206, 406 is adjusted at an initial installation such that the switches just open when a mating coupling is completely inserted into the rack coupling.

Where the poppet valve 108 travels up to 1 inch when a mating coupling is connected, the sensor may be adjusted such that the sensor only detects when the paddle arms are in the down position indicating a complete seal.

Figure 6:
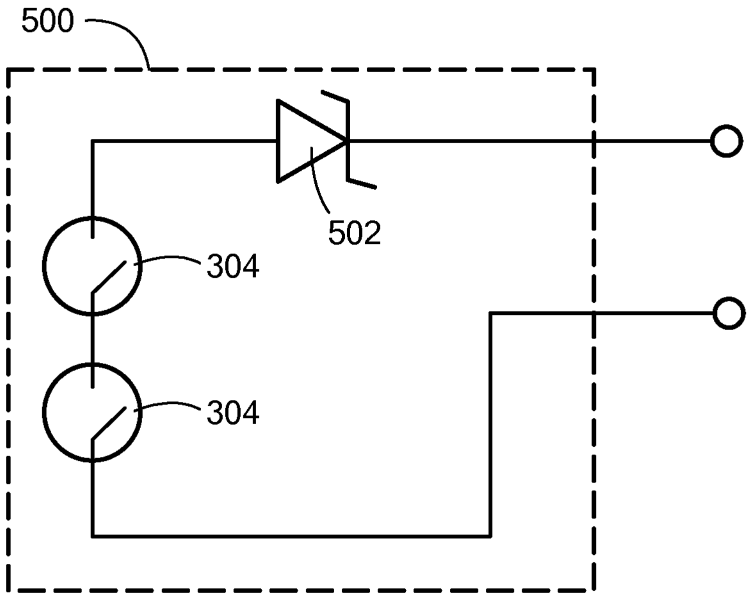
FIG. 6 is an alternate embodiment of a sensing circuit.

As shown in FIG. 6, a Zener diode 502 may be used in place of the diode 302 and the controller modified accordingly to look for a particular voltage as would be understood by one of ordinary skill in the art. While the circuit shown in FIG. 6 is represented as being implemented with normally open switches, one of ordinary skill in the art will understand how to implement with normally closed switches.

Figure 7:
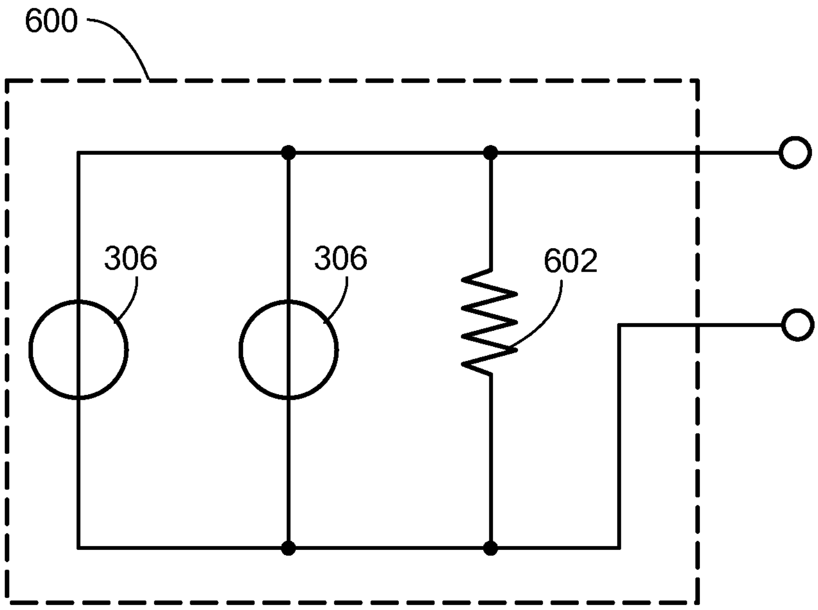
FIG. 7 is another alternate embodiment of a sensing circuit.

As shown in FIG. 7, a resistor 602 may be used in place of the diode 302 and the controller modified accordingly to look for either a particular voltage, if part of a divider circuit, or a particular resistance value or change, as would be understood by one of ordinary skill in the art. While the circuit shown in FIG. 7 is represented as implemented with normally closed switches, one of ordinary skill in the art will understand how to implement with normally open switches.

Figure 8:
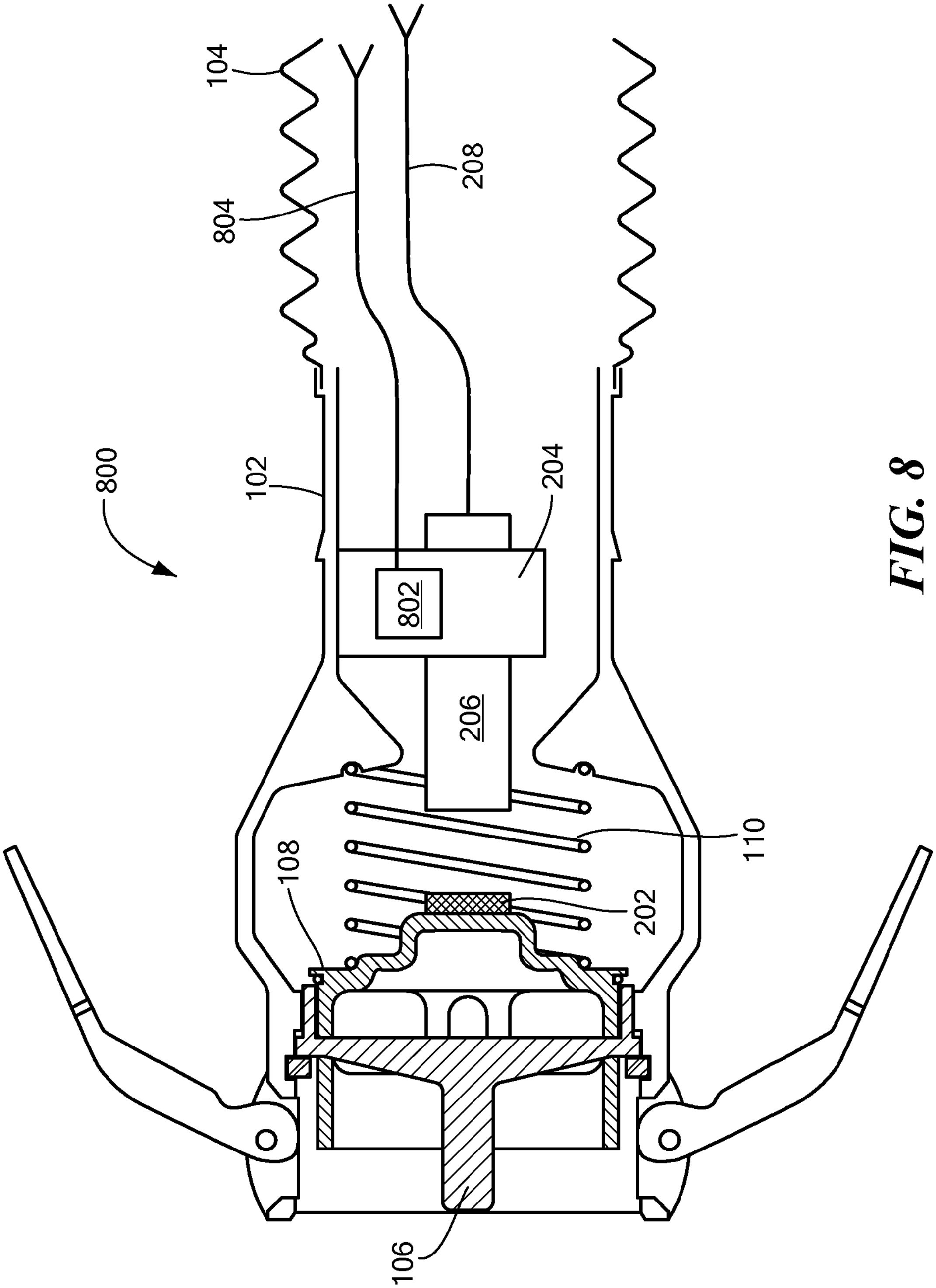
FIG. 8 is another embodiment of the present invention where a vapor flow sensor is incorporated into the vapor coupler.

In some applications it may be necessary to confirm that vapor is indeed flowing in addition to confirming that the hose has been mechanically coupled to the source. Accordingly, referring now to FIG. 8, a vapor sensor coupling 800 comprises the embodiment of the present invention shown in FIGS. 2A and 2B, i.e., a magnetic sensor to determine whether the valve is open or closed, and a vapor flow sensor 802. The vapor flow sensor 802 is provided in the expected vapor flow path and may be mounted on the same mounting block 204 as the sensor 206 or it may be mounted on its own separately from the sensor 206. As one of ordinary skill in the art will understand, the vapor flow sensor 802 would be mounted in such a location that it would be exposed to the expected vapor flow path.

In one embodiment, the vapor flow sensor 802 is of the known dual thermistor type. Alternatively, any known type of vapor flow sensor may be implemented as long as it meets the requirements of the system. A separate output wire 804 from the vapor flow sensor 802 is provided to provide an output signal back to a controller, similar to the wire 208 from the sensor 206. As a result, the fueling controller is provided with a separate output as to the condition of vapor flow.

Advantageously, the coupling 800 provides for both mechanical confirmation of the connection by operation of the magnetic proximity switch along with a mechanism for measuring the vapor flow right at the source. Measuring flow right at the source, or very close thereto, reduces the chances of the fuel controlling system receiving a false positive confirmation of vapor flow. In some instances it is known that turbulence present farther down the hose, for example, where multiple hoses may be each providing their respective flows to a system of baffles, can sometimes lead to an indication of flow where there is none, if the flow sensor is located there. Depending on the turbulence, an otherwise not flowing hose may be incorrectly identified as flowing properly.

Another embodiment of the system 800 would include the ferrous material sensor and its corresponding circuitry in the system 800 as described above.

While an embodiment of the present invention has been described with respect to a vapor recovery system, it should be noted that the features of the present invention may be used in other applications. Thus, the state of the valve may be detected in systems where a fluid other than vapor, for example, a liquid, is expected to flow. Accordingly, the sensor would be designed to function under those conditions. Similarly, if the fluid were corrosive, then the sensor, or any other exposed components, would be properly protected.

While a poppet valve was described, it is expected that the teachings of the present invention may be applied to other types of valves including, but not limited to, a butterfly valve, a screw valve, a ball valve, a stem valve and a gate valve. One of ordinary skill in the art will understand how to apply these teachings to the various types of valves.

The magnet, in one embodiment, is externally placed on the valve, an alternate embodiment of the present invention includes the magnet being provided within the valve. In one non-limiting example, a cavity or reservoir, may be provided within the valve material and a magnet placed within and covered over. Alternately, the valve itself, or a portion, may be magnetized if made from material that can be given a magnetic field.

In addition, while an embodiment has been described with a magnetic proximity sensor on one side and a ferrous material sensor on the other, a ferrous material sensor may be used in place of the magnetic sensor. In this embodiment, instead of the magnet, a piece of ferrous material would be provided and, instead of the magnetic proximity switch, the ferrous material sensor, will detect the movement. This embodiment, of course, assumes that the valve assembly itself is not of a ferrous material.

Having thus described several features of at least one embodiment of the present invention, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A vapor coupler comprising:
- a housing;
- a valve disposed in the housing;
- a valve position sensing apparatus, coupled to the housing, configured to sense a position of the valve and to provide a signal indicating whether the valve is open or closed; and
- a ferrous metal proximity sensor switch provided in the valve and coupled to the valve position sensing apparatus.

2. The vapor coupler of claim 1, further comprising:
- a vapor flow sensor disposed within the housing and configured to output a signal representative of vapor flow through the valve.

3. The vapor coupler of claim 1, wherein the valve position sensing apparatus comprises:
- a magnet disposed on a distal side of the valve; and
- a first proximity sensor coupled to the housing and adjacent to, and spaced apart from, the magnet,
- wherein the first proximity sensor is configured to detect a distance from the first proximity sensor to the magnet to provide the signal indicating whether the valve is open or closed.

4. The vapor coupler of claim 3, wherein the ferrous metal proximity sensor switch is coupled to the first proximity sensor.

5. The vapor coupler of claim 3, wherein the valve is a poppet valve.

6. The vapor coupler of claim 3, wherein the first proximity sensor comprises at least one magnetic reed switch that changes state when a distance from the at least one magnetic reed switch to the magnet changes from greater than a predetermined distance to less than or equal to the predetermined distance.

7. The vapor coupler of claim 6, wherein the ferrous metal proximity sensor switch is provided in a proximal portion of the valve.

8. The vapor coupler of claim 6, wherein the first proximity sensor further comprises:
- first and second contacts; and
- a diode,
- wherein the diode and the at least one magnetic reed switch are arranged in series with one another between the first and second contacts, and
- wherein each at least one magnetic reed switch is of a normally-open type.

9. The vapor coupler of claim 8, wherein the diode is a Zener diode.

10. The vapor coupler of claim 8, wherein the ferrous metal proximity sensor switch is provided in a proximal portion of the valve,
- wherein the ferrous metal proximity sensor switch is coupled in series with the diode and the at least one magnetic reed switch between the first and second contacts, and
- wherein the ferrous metal proximity sensor switch is of a normally-open type.

11. The vapor coupler of claim 6, wherein the first proximity sensor further comprises:
- first and second contacts; and
- a diode coupled across the first and second contacts,
- wherein each of the at least one magnetic reed switch is disposed in parallel with the diode, and
- wherein each at least one magnetic reed switch is of a normally-closed type.

12. The vapor coupler of claim 11, wherein the diode is a Zener diode.

13. The vapor coupler of claim 11, wherein the ferrous metal proximity sensor switch is provided in a proximal portion of the valve,
- wherein the ferrous metal proximity sensor switch is coupled in parallel with the diode, and
- wherein the ferrous metal proximity sensor switch is of a normally-closed type.

14. A vapor coupler comprising:
- a housing;
- a valve assembly disposed in the housing, the valve assembly having a proximal side and a distal side;
- a magnet disposed on the distal side of the valve assembly;
- a first proximity sensor coupled to the housing and adjacent to, and spaced apart from, the magnet; and
- a ferrous metal proximity sensor switch provided in the valve assembly and coupled to the first proximity sensor,
- wherein the first proximity sensor is configured to detect a distance from the first proximity sensor to the magnet to provide a first signal when the valve assembly is closed and a second signal when the valve assembly is open.

15. The vapor coupler of claim 14, wherein the ferrous metal proximity sensor switch is provided on the proximal side of the valve assembly.

16. The vapor coupler of claim 14, further comprising:
- a vapor flow sensor disposed within the housing and configured to output a signal representative of vapor flow through the valve assembly.

17. The vapor coupler of claim 14, wherein the first proximity sensor comprises at least one magnetic reed switch that changes state when a distance between the at least one magnetic reed switch and the magnet changes from greater than a predetermined distance to less than or equal to the predetermined distance.

18. The vapor coupler of claim 17, wherein the ferrous metal proximity sensor switch provided on the proximal side of the valve assembly.

19. The vapor coupler of claim 17, wherein the first proximity sensor further comprises:
- first and second contacts; and
- a diode, wherein the diode and the at least one magnetic reed switch are arranged in series with one another between the first and second contacts, and wherein each at least one magnetic reed switch is of a normally-open type.

20. The vapor coupler of claim 19, wherein the diode is a Zener diode.

21. The vapor coupler of claim 19, wherein the ferrous metal proximity sensor switch is provided on the proximal side of the valve assembly, wherein the ferrous metal proximity sensor switch is coupled in series with the diode and the at least one magnetic reed switch between the first and second contacts, and wherein the ferrous metal proximity sensor switch is of a normally-open type.

22. The vapor coupler of claim 17, wherein the first proximity sensor further comprises:

first and second contacts; and a diode coupled across the first and second contacts, wherein each of the at least one magnetic reed switch is disposed in parallel with the diode, and wherein each at least one magnetic reed switch is of a normally-closed type.

23. The vapor coupler of claim 22, wherein the diode is a Zener diode.

24. The vapor coupler of claim 22, wherein the ferrous metal proximity sensor switch is provided on the proximal side of the valve assembly, the ferrous metal proximity sensor switch is coupled in parallel with the diode, and wherein the ferrous metal proximity sensor switch is of a normally-closed type.

25. An interlock monitoring system, comprising:

a vapor collection hose comprising a poppet valve assembly within a housing;

a magnet disposed on a back side of the poppet valve assembly;

a first proximity sensor provided within the housing; and a ferrous metal proximity sensor switch provided in the poppet valve assembly and coupled to the first proximity sensor, wherein the first proximity sensor is configured to determine a distance from the first proximity sensor to the magnet to provide a signal indicating whether the poppet valve assembly is open or closed.

26. The interlock monitoring system of claim 25, further comprising:

a vapor flow sensor disposed within the housing and configured to output a signal representative of vapor flow through the poppet valve assembly.

27. The interlock monitoring system of claim 25, wherein the ferrous metal proximity sensor switch is provided in a pin portion of the poppet valve assembly.

28. The interlock monitoring system of claim 25, wherein the first proximity sensor comprises at least one magnetic reed switch that changes state when a distance between the at least one magnetic reed switch and the magnet changes from greater than a predetermined distance to less than or equal to the predetermined distance.

29. The interlock monitoring system of claim 28, wherein the ferrous metal proximity sensor switch is provided in a pin portion of the poppet valve assembly.

30. The interlock monitoring system of claim 28, wherein the first proximity sensor further comprises:

first and second contacts; and a diode, wherein the diode and the at least one magnetic reed switch are arranged in series with one another between the first and second contacts, and wherein each at least one magnetic reed switch is of a normally-open type.

31. The interlock monitoring system of claim 30, wherein the diode is a Zener diode.

32. The interlock monitoring system of claim 30, wherein the ferrous metal proximity sensor switch is provided in a pin portion of the poppet valve assembly, wherein the ferrous metal proximity sensor switch is coupled in series with the diode and the at least one magnetic reed switch between the first and second contacts, and wherein the ferrous metal proximity sensor switch is of a normally-open type.

33. The interlock monitoring system of claim 28, wherein the first proximity sensor further comprises:

first and second contacts; and a diode coupled across the first and second contacts, wherein each of the at least one magnetic reed switch is disposed in parallel with the diode, and wherein each at least one magnetic reed switch is of a normally-closed type.

34. The interlock monitoring system of claim 33, wherein the diode is a Zener diode.

35. The interlock monitoring system of claim 33, wherein the ferrous metal proximity sensor switch is provided in a pin portion of the poppet valve assembly, wherein the ferrous metal proximity sensor switch is coupled in parallel with the diode, and wherein the ferrous metal proximity sensor switch is of a normally-closed type.

36. A coupling apparatus comprising:

a valve comprising a moveable portion, the moveable portion having a first side and a second side;

a housing coupled to the valve;

a ferrous metal proximity sensor switch provided in the moveable portion of the valve, and a first proximity sensor disposed in the housing and adjacent to, but spaced away from, the first side of the moveable portion, wherein the first proximity sensor is configured to detect a location of the first side of the moveable portion and to provide a signal indicating whether the valve is open or closed, and wherein the ferrous metal proximity sensor switch is coupled to the first proximity sensor.

37. The coupling apparatus of claim 36, further comprising:

a vapor flow sensor disposed within the housing and configured to output a signal representative of vapor flow through the valve.

38. The coupling apparatus of claim 36, wherein the ferrous metal proximity sensor switch is provided in the second side of the moveable portion.

39. The coupling apparatus of claim 36, further comprising a magnet disposed on the first side of the moveable portion, wherein the first proximity sensor comprises at least one magnetic reed switch that changes state when a distance between the at least one magnetic reed switch and the magnet changes from greater than a predetermined distance to less than or equal to the predetermined distance.

40. The coupling apparatus of claim 39, wherein the ferrous metal proximity sensor switch is provided on the second side of the moveable portion, and wherein the ferrous metal proximity sensor switch is coupled to the first proximity sensor.

41. The coupling apparatus of claim 39, wherein the first proximity sensor further comprises:

first and second contacts; and a diode, wherein the diode and the at least one magnetic reed switch are arranged in series with one another between the first and second contacts, and wherein each at least one magnetic reed switch is of a normally-open type.

42. The coupling apparatus of claim 41, wherein the diode is a Zener diode.

43. The coupling apparatus of claim 41, wherein the ferrous metal proximity sensor switch is provided on the second side of the moveable portion, wherein the ferrous metal proximity sensor switch is coupled in series with the diode and the at least one magnetic reed switch between the first and second contacts, and wherein the ferrous metal proximity sensor switch is of a normally-open type.

44. The coupling apparatus of claim 39, wherein the first proximity sensor further comprises:

first and second contacts; and a diode coupled across the first and second contacts, wherein each of the at least one magnetic reed switch is disposed in parallel with the diode, and wherein each at least one magnetic reed switch is of a normally-closed type.

45. The coupling apparatus of claim 44, wherein the diode is a Zener diode.

46. The coupling apparatus of claim 44, wherein the ferrous metal proximity sensor switch is provided on the second side of the moveable portion, wherein the ferrous metal proximity sensor switch is coupled in parallel with the diode, and wherein the ferrous metal proximity sensor switch is of a normally-closed type.

47. A method of determining a proper connection of a vapor recovery hose having a valve, the method comprising;

detecting a position of the valve;

detecting a predetermined type of material in contact with a first portion of the valve; and determining that the vapor recovery hose is properly connected when the detected position is an open position and the detected material is of the predetermined type.

48. The method of claim 47, wherein detecting the position of the valve comprises:

detecting a location of a magnet disposed on a first side of a moveable portion of the valve.

49. The method of claim 47, wherein detecting a predetermined type of material is in contact with the first portion of the valve comprises detecting a signal from a material detector disposed on a second side of a moveable portion of the valve.

50. The method of claim 47, wherein:

detecting the position of the valve comprises detecting a location of a magnet disposed on a first side of a moveable portion of the valve; and detecting a predetermined type of material is in contact with the first portion of the valve comprises detecting a signal from a material detector disposed on a second side of the moveable portion of the valve, wherein the first and second sides are opposite one another.

51. The method of claim 50, wherein the predetermined type of material is a ferrous material.

52. The method of claim 47, further comprising:

measuring an amount of vapor flow; and asserting an error condition signal if it is determined that the measured amount of vapor flow does not meet a predetermined threshold.

53. A coupling apparatus comprising:

means for controlling fluid flow through a conduit;

means for detecting a type of material adjacent the fluid flow controlling means and for providing a signal representative thereof;

means for determining a state of the fluid flow controlling means; and means, coupled to the determining means, for providing a signal representative of the state of the fluid flow controlling means.

54. The coupling apparatus of claim 53, further comprising:

means for measuring a rate of fluid flow through the fluid flow controlling means.

55. The coupling apparatus of claim 53, wherein the state determining means comprise:

means for detecting movement of the fluid flow controlling means.

56. The coupling apparatus of claim 55, wherein the fluid flow controlling means comprise a valve.

* * * * *